(12) United States Patent
Elwood

(10) Patent No.: US 9,233,598 B1
(45) Date of Patent: Jan. 12, 2016

(54) SUN VISOR

(71) Applicant: Kay Elwood, Moscow Mills, MO (US)

(72) Inventor: Kay Elwood, Moscow Mills, MO (US)

(*) Notice: Subject to any disclaimer, the term of this patent is extended or adjusted under 35 U.S.C. 154(b) by 0 days.

(21) Appl. No.: 14/478,593

(22) Filed: Sep. 5, 2014

(51) Int. Cl.
*B60J 3/02* (2006.01)

(52) U.S. Cl.
CPC .............. *B60J 3/0208* (2013.01); *B60J 3/0217* (2013.01)

(58) Field of Classification Search
CPC ...... B60J 3/0208; Y10S 160/03; B60R 11/02; B60R 5/047; B60R 11/00; B60R 2011/0014; B60R 2011/0028; B60R 2011/0061; B60R 2011/0075; B60R 7/05
USPC .......... 296/97.8, 97.9, 97.1, 97.4, 223, 24.34, 296/70, 95.1, 99.1; 297/184.1; 52/2.22; 180/313, 89.12
See application file for complete search history.

(56) References Cited

U.S. PATENT DOCUMENTS

| 4,828,314 | A | 5/1989 | Gavagan | |
|---|---|---|---|---|
| 5,271,653 | A * | 12/1993 | Shirley | 296/97.8 |
| 5,472,255 | A * | 12/1995 | Moore | 296/97.6 |
| 5,662,371 | A | 9/1997 | Gera et al. | |
| 5,730,484 | A * | 3/1998 | Robinson | 296/97.6 |
| 5,842,748 | A * | 12/1998 | Cummins | 296/97.2 |
| 6,139,084 | A | 10/2000 | Miles | |
| 6,412,850 | B1 * | 7/2002 | Francis et al. | 296/97.6 |
| 6,565,140 | B2 | 5/2003 | Wells | |
| 8,789,870 | B1 * | 7/2014 | Tolbert | 296/97.8 |

\* cited by examiner

*Primary Examiner* — Glenn Dayoan
*Assistant Examiner* — Sunsurraye Westbrook
(74) *Attorney, Agent, or Firm* — Crossley Patent Law

(57) ABSTRACT

A sun visor including a sun visor body having a front side, back side, top side, bottom side, right side and left side. A first cavity and a second cavity disposed within the sun visor body separated by a dividing wall. A sun vision visor and a night vision visor contained within the respective first cavity and second cavity. Each of the sun vision visor and the night vision visor are contained within each of the respective first cavity and second cavity when in a retracted position. Each of the sun vision visor and the night vision visor are extendable to an extended position for use when needed. A friction hinge is disposed on each of the sun vision visor and the night vision visor allowing multi-directionally pivotablility of each visor toward each of the front side and the back side for desired positioning when in an extended position.

6 Claims, 4 Drawing Sheets

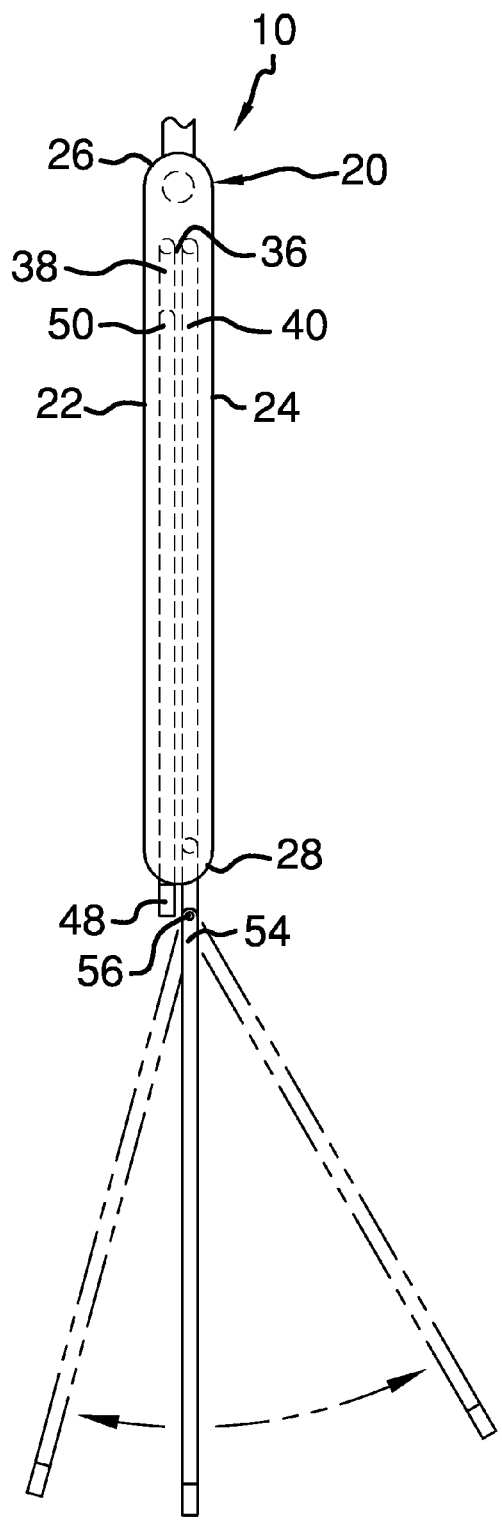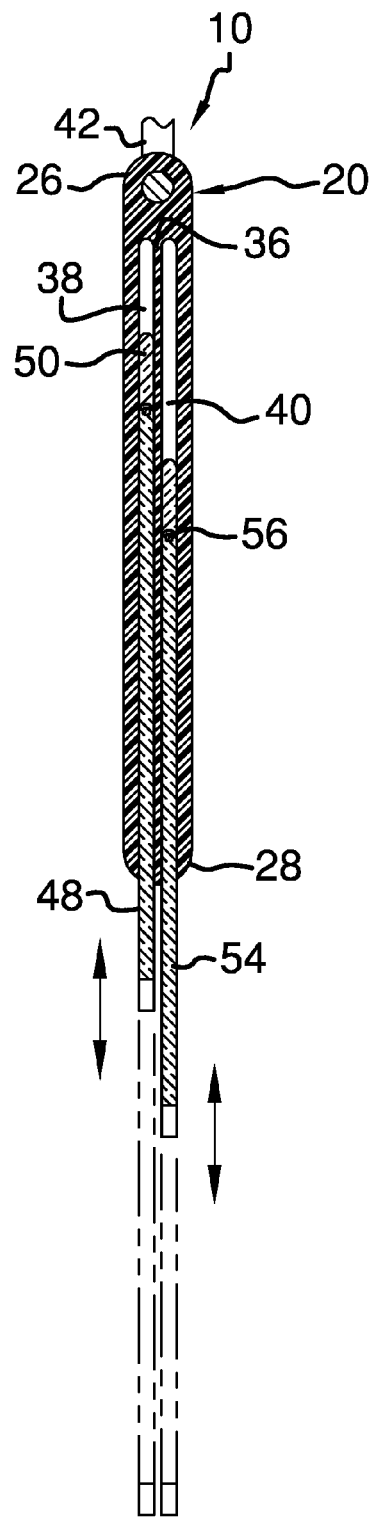

SUN VISOR

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of sun visors are known in the prior art. However, what is needed is a sun visor body including an extendable and pivotable sun vision visor and an extendable and pivotable night vision visor. Current sun visors do not provide multiple extendable options. The present device allows a user to extend a sun vision visor from a retracted position contained within the sun visor body to an extended position. The sun vision visor has a transparent material providing visibility with a tint to block the glare of the sun. The night vision visor has a transparent material providing visibility with a lesser tint than that of the sun vision visor to block the glare of lights from other vehicles. The present device provides the normal protection and positioning of a standard sun visor along with the added protection of the sun vision visor and the night vision visor.

FIELD OF THE INVENTION

The present invention relates to sun visors, and more particularly, to a sun visor which has an extendable and pivotable sun vision visor and an extendable and pivotable night vision visor.

SUMMARY OF THE INVENTION

The general purpose of the present sun visor, described subsequently in greater detail, is to provide a sun visor which has many novel features that result in a sun visor which is not anticipated, rendered obvious, suggested, or even implied by prior art, either alone or in combination thereof.

To accomplish this, the present sun visor includes sun visor body having a front side, a back side, a top side, a bottom side, a right side, and a left side. An indentation is disposed along the top side proximal the right side. A continuous dividing wall is centrally disposed between the front side and the back side. A continuous internal first cavity is disposed entirely between the front side and the dividing wall. A continuous internal second cavity is disposed entirely between the dividing wall and the back side. A pivot rod is continuously disposed within the top side and through the indentation. The pivot rod has an L-shaped first edge configured to securingly pivotably engage a first securement member on an interior side of a vehicle roof to secure the sun visor to the interior side of the vehicle roof. The pivot rod further has an exposed portion disposed within the indentation. The exposed portion is configured to engage a second securement member on an interior side of the vehicle roof to secure the sun visor to the vehicle roof in a fixed position.

There is a sun vision visor with a first end disposed proximal the top side and a second end disposed proximal the bottom side in a first position. The sun vision visor is slidingly engagingly disposed within the first cavity in a retracted position.

A night vision visor structurally identical to the sun vision visor is slidingly engagingly disposed within the second cavity in the retracted position.

A friction hinge is continuously disposed along the first end of each of the sun vision visor and the night vision visor. Each of the sun vision visor and the nigh vision visor when in the extended position is multi-directionally pivotable toward each of the front side and the back side to allow the user to position each of the sun vision visor and the night vision visor in a desired position.

A protrusion is disposed on the second end of each of the sun vision visor and the night vision visor. Each protrusion provides access to each of the sun vision visor and the night vision visor when each of the sun vision visor and the night vision visor are in the retracted position allowing a user to place each of the sun vision visor and the night vision visor in the extended position.

Each of the sun vision visor and the night vision visor are made of a transparent material. The transparent material of the sun vision visor has a tint darker than a tint of the transparent material of the night visions visor. The transparent material allows a user to see through each of the sun vision visor and the night vision visor while providing protection from blinding sunlight and alternately blinding lights from other vehicles while driving.

Thus has been broadly outlined the more important features of the present sun visor so that the detailed description thereof that follows may be better understood and in order that the present contribution to the art may be better appreciated.

BRIEF DESCRIPTION OF THE DRAWINGS

Figures

FIG. 4 is a side elevation view showing the pivotability of the night vision visor in an extended position and the sun vision visor in a retracted position.

FIG. 5 is a cross-sectional view taken along line 5-5 of FIG. 3 showing the extendibility of the sun vision visor and the night vision visor.

DETAILED DESCRIPTION OF THE DRAWINGS

Figure 1:
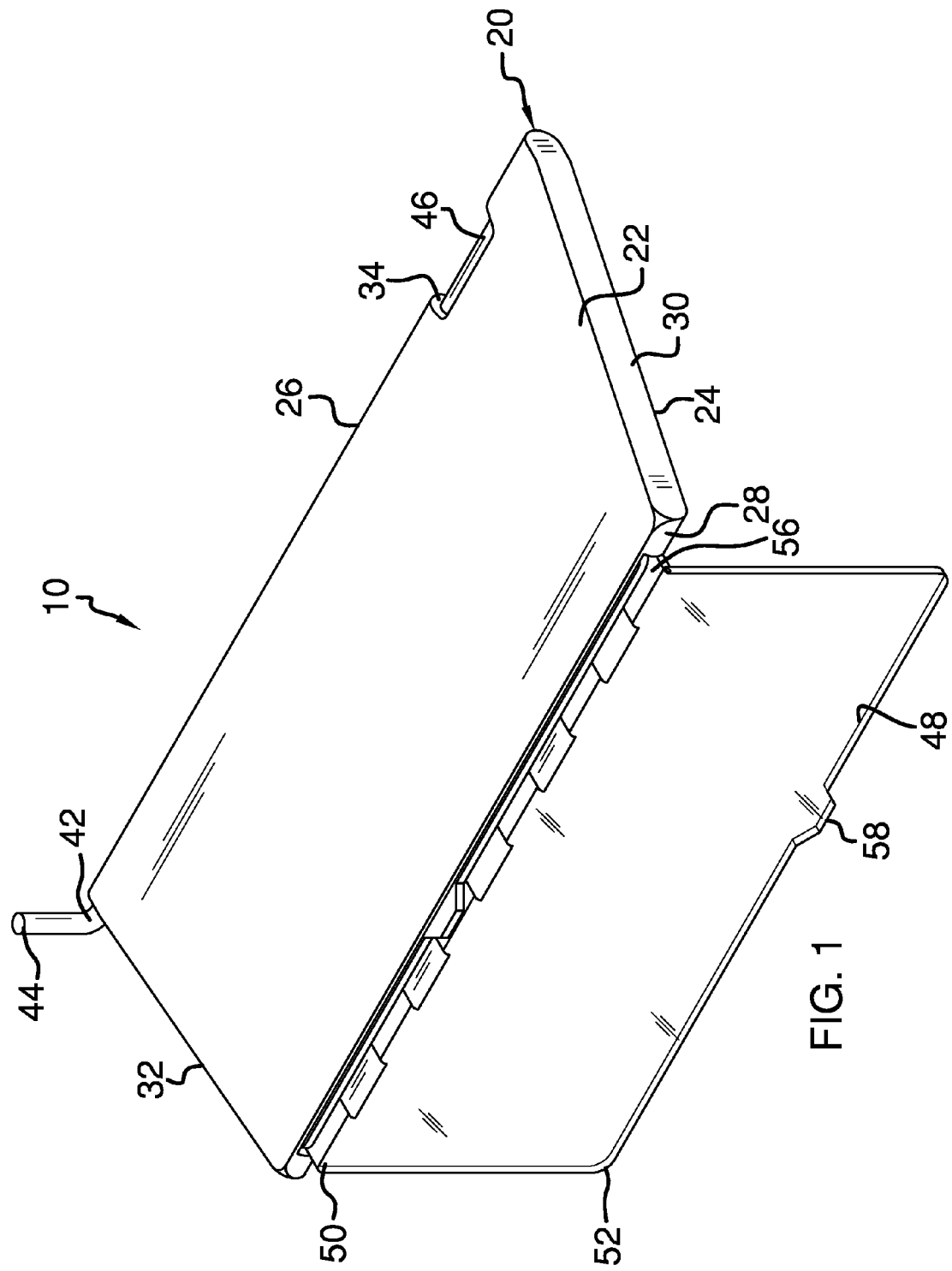
FIG. 1 is an isometric view with a night vision visor extended in a position perpendicular to a sun visor.
Figure 2:
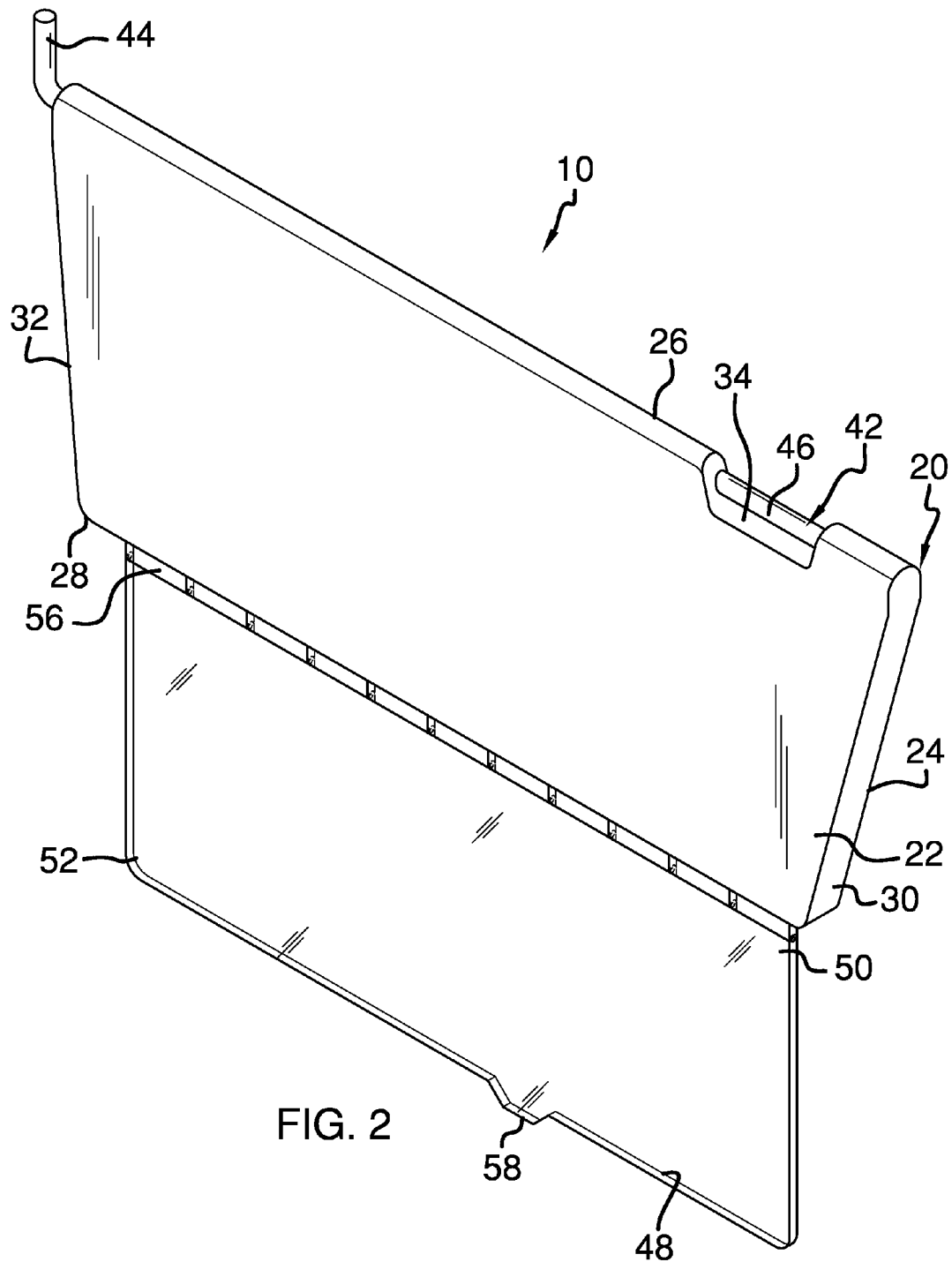
FIG. 2 is an isometric view with the night vision visor extended in a same vertical plane as the sun visor.
Figure 3:
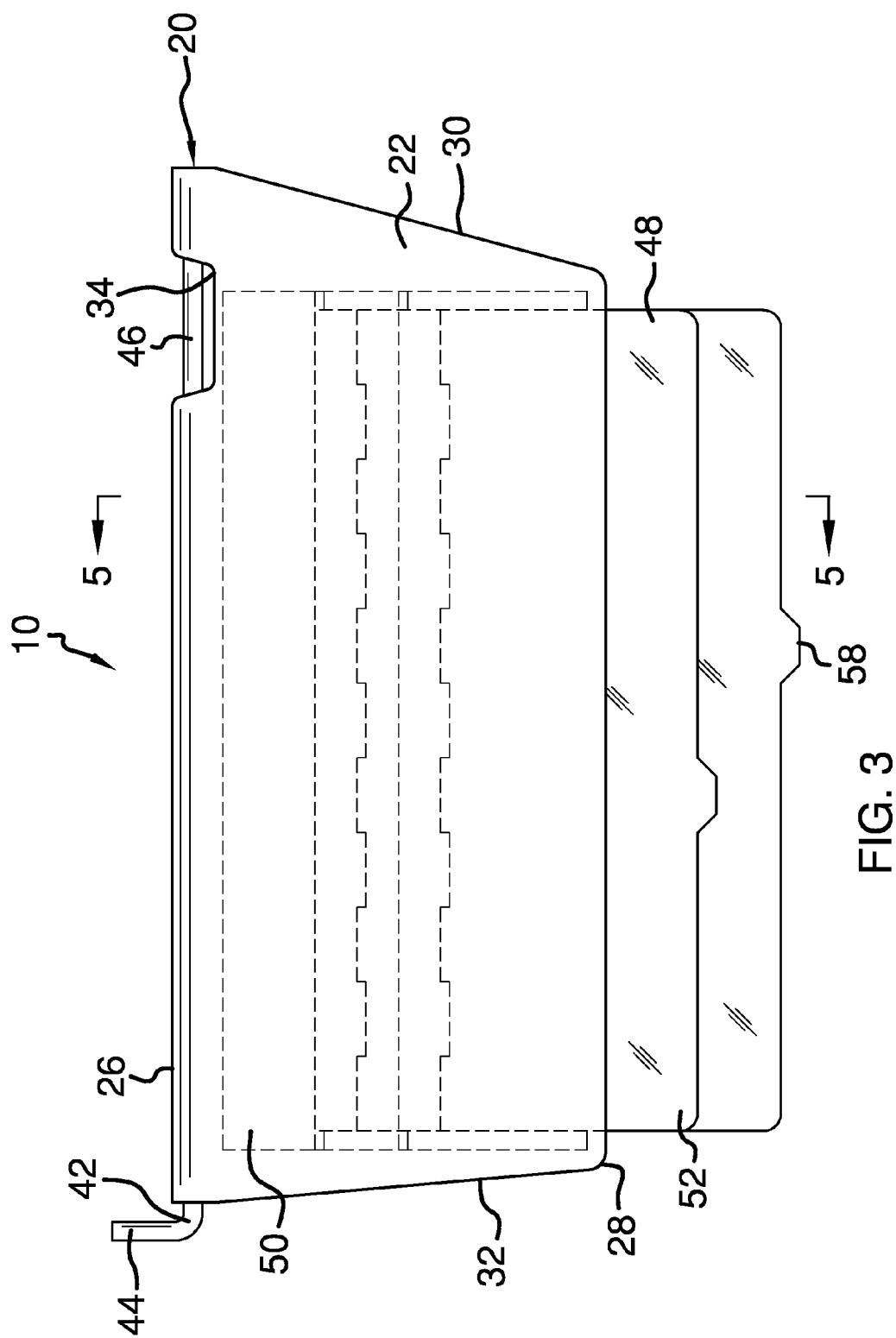
FIG. 3 is a front elevation view.

With reference now to the drawings, and in particular FIGS. 1 through 5 thereof, an example of the instant sun visor employing the principles and concepts of the present sun visor and generally designated by the reference number 10 will be described.

Referring to FIGS. 1 through 5 the present sun visor 10 is illustrated. The sun visor 10 includes a sun visor body 20 having a front side 22, a back side 24, a top side 26, a bottom side 28, a right side 30, and a left side 32. An indentation 34 is disposed along the top side 26 proximal the right side 30. A continuous dividing wall 36 is centrally disposed between the front side 22 and the back side 24. A continuous internal first cavity 38 is disposed entirely between the front side 22 and the dividing wall 36. A continuous internal second cavity 40 is disposed entirely between the dividing wall 36 and the back side 24. A pivot rod 42 is continuously disposed within the top side 26 and through the indentation 34. The pivot rod 42 has an L-shaped first edge 44 configured to securingly pivotably engage a first securement member on an interior side of a vehicle roof to secure the sun visor to the interior side of the vehicle roof. The pivot rod 42 further has an exposed portion 46 disposed within the indentation 34. The exposed portion 46 is configured to engage a second securement member on an interior side of the vehicle roof to secure the sun visor to the vehicle roof in a fixed position.

There is a sun vision visor 48 with a first end 50 disposed proximal the top side 26 and a second end 52 disposed proximal the bottom side 28 in a first position. The sun vision visor 48 is slidingly engagingly disposed within the first cavity 38 in a retracted position.

A night vision visor 54 structurally identical to the sun vision visor 48 is slidingly engagingly disposed within the second cavity 40 in the retracted position.

A friction hinge 56 is continuously disposed along the first end 50 of each of the sun vision visor 48 and the night vision visor 54. Each of the sun vision visor 48 and the nigh vision visor 54 when in the extended position is multi-directionally pivotable toward each of the front side 22 and the back side 24.

Each of the sun vision visor 48 and the night vision visor 54 in the retracted position is completely contained within each of the respective first cavity 38 and second cavity 40. Each of the sun vision visor 48 and the night vision visor 54 is extendible from the retracted position within each of the respective first cavity 38 and second cavity 40. The ability to retract or extend each of the sun vision visor 48 and the night vision visor 54 allow the user to utilize each of the sun vision visor 48 and the night vision visor 54 when conditions prove necessary and allow the user to store each of the sun vision visor 48 and the night vision visor 58 when not in use.

A protrusion 58 is disposed on the second end 52 of each of the sun vision visor 48 and the night vision visor 54. Each protrusion 58 provides access to each of the sun vision visor 48 and the night vision visor 54 when each of the sun vision visor 48 and the night vision visor 54 are in the retracted position allowing a user to place each of the sun vision visor 48 and the night vision visor 54 in the extended position.

What is claimed is:

1. A sun visor comprising:
   a sun visor body having a front side, a back side, a top side, a bottom side, a
   right side, and a left side;
   an indentation disposed along the top side proximal the right side;
   a continuous dividing wall centrally disposed between the front side and the back side;
   a continuous internal first cavity disposed entirely between the front side and the dividing wall;
   a continuous internal second cavity, the second cavity disposed entirely between the dividing wall and the back side, the internal first and second cavities being disposed parallel to each other within the sun visor body;
   a pivot rod continuously disposed within the top side and through the indentation, the pivot rod having an L-shaped first edge configured to securingly pivotably engage a first securement member on an interior side of a vehicle roof to secure the sun visor to the interior side of the vehicle roof, and further having an exposed portion disposed within the indentation, the exposed portion configured to engage a second securement member on an interior side of the vehicle roof to secure the sun visor to the vehicle roof in a fixed position;
   a sun vision visor having a first end disposed proximal the top side and a second end disposed proximal the bottom side in a first position, the sun vision visor slidingly engagingly disposed within the first cavity in a retracted position; and
   a night vision visor structurally identical to the sun vision visor, the night vision visor slidingly engagingly disposed within the second cavity in the retracted position;
   wherein each of the sun vision visor and the night vision visor in the retracted position is completely contained within each of the respective first cavity and second cavity;
   wherein each of the sun vision visor and the night vision visor is extendible from the retracted position within each of the respective first cavity and second cavity; and
   wherein the pivot rod is configured to allow the sun visor to be placed in a desired position.

2. The sun visor of claim 1 further comprising a friction hinge continuously disposed along the first end of each of the sun vision visor and the night vision visor wherein each of the sun vision visor and the nigh vision visor when in the extended position is multi-directionally pivotable toward each of the front side and the back side.

3. The sun visor of claim 2 further comprising a protrusion disposed on the second end of each of the sun vision visor and the night vision visor, each protrusion configured to provide access to each of the sun vision visor and the night vision visor when each of the sun vision visor and the night vision visor are in the retracted position.

4. The sun visor of claim 3 further comprising a transparent material of each of the sun vision visor and the night visions visor, the transparent material of the sun vision visor having a tint darker than a tint of the transparent material of the night visions visor;
   wherein the sun vision visor is configured to provide protection from the sun;
   wherein the night vision visor is configured to provide protection from the glare of lights while driving at night.

5. The sun visor of claim 4 wherein the dividing wall has an upper end terminating proximal the pivot rod.

6. A sun visor comprising:
   a sun visor body having a front side, a back side, a top side, a bottom side, a right side, and a left side;
   an indentation disposed along the top side proximal the right side;
   a continuous dividing wall centrally disposed between the front side and the back side;
   a continuous internal first cavity disposed entirely between the front side and the dividing wall;
   a continuous internal second cavity, the second cavity disposed entirely between the dividing wall and the back side, the internal first and second cavities being disposed parallel to each other within the sun visor body;
   a pivot rod continuously disposed within the top side and through the indentation, the pivot rod having an L-shaped first edge configured to securingly pivotably engage a first securement member on an interior side of a vehicle roof to secure the sun visor to the interior side of the vehicle roof, and further having an exposed portion disposed within the indentation, the exposed portion configured to engage a second securement member on an interior side of the vehicle roof to secure the sun visor to the vehicle roof in a fixed position;
   a sun vision visor having a first end disposed proximal the top side and a second end disposed proximal the bottom side in a first position, the sun vision visor slidingly engagingly disposed within the first cavity in a retracted position;

a night vision visor structurally identical to the sun vision visor, the night vision visor slidingly engagingly disposed within the second cavity in the retracted position;

a friction hinge continuously disposed along the first end of each of the sun vision visor and the night vision visor wherein each of the sun vision visor and the nigh vision visor when in the extended position is multi-directionally pivotable toward each of the front side and the back side;

a protrusion disposed on the second end of each of the sun vision visor and the night vision visor, each protrusion configured to provide access to each of the sun vision visor and the night vision visor when each of the sun vision visor and the night vision visor are in the retracted position; and a transparent material of each of the sun vision visor and the night visions visor, the transparent material of the sun vision visor having a tint darker than a tint of the transparent material of the night visions visor;

wherein the dividing wall has an upper end terminating proximal the pivot rod wherein the sun vision visor is configured to provide protection from the sun;

wherein the night vision visor is configured to provide protection from the glare of lights while driving at night;

wherein each of the sun vision visor and the night vision visor in the retracted position is completely contained within each of the respective first cavity and second cavity;

wherein each of the sun vision visor and the night vision visor is extendible from the retracted position within each of the respective first cavity and second cavity; and wherein the pivot rod is configured to allow the sun visor to be placed in a desired position.

* * * * *